US006383245B1

(12) United States Patent
Yamashita

(10) Patent No.: US 6,383,245 B1
(45) Date of Patent: May 7, 2002

(54) AQUEOUS MINERAL COMPOSITIONS AND METHODS FOR THEIR USE

(76) Inventor: Thomas T. Yamashita, 677 E. Olive, Turlock, CA (US) 95380

( * ) Notice: Subject to any disclaimer, the term of this patent is extended or adjusted under 35 U.S.C. 154(b) by 0 days.

(21) Appl. No.: 09/543,449

(22) Filed: Apr. 5, 2000

(51) Int. Cl.[7] .......................... C05F 11/08; C05G 5/00

(52) U.S. Cl. ......................... 71/6; 71/11; 71/27; 71/31; 71/64.1; 71/DIG. 2

(58) Field of Search ............................ 71/11, 26, 64.1, 71/6, 27, 31, DIG. 2

(56) References Cited

U.S. PATENT DOCUMENTS

| | | | | |
|---|---|---|---|---|
| 3,986,859 A | * 10/1976 | Molinet | 71/1 |
| 5,372,626 A | 12/1994 | Zivion et al. | |
| 5,549,729 A | 8/1996 | Yamashita | 71/26 |
| 5,582,627 A | 12/1996 | Yamashita | 71/26 |
| 5,696,091 A | 12/1997 | Yamashita | 514/54 |
| 5,772,723 A | 6/1998 | Robinett et al. | |
| 5,797,976 A | 8/1998 | Yamashita | 71/26 |
| 5,830,255 A | 11/1998 | Lovatt | |
| 6,206,946 B1 | * 3/2001 | Hayashi et al. | 71/64.1 |

FOREIGN PATENT DOCUMENTS

JP 165815 * 6/1994

OTHER PUBLICATIONS

Tina L. Bell et al, "Response of Mycorrhizal Seedlings of SW Australian Sandplain Epacridaceae to Added Nitrogen and Phosphorus", *Journal of Experimental Botany*, vol. 45, No. 275, pp. 779–790 (Jun. 1994).*

A.L. Singh et al, "Foliar Application of Iron for Recovering Ground Nut Plants from Lime–Induced Iron Deficiency Chlorosis and Accompanying Losses in Yields", *Journal of Plant Nutrition*, 15(9), 1421–1433 (1992). (No month).*

* cited by examiner

*Primary Examiner*—Wayne A. Langel
(74) *Attorney, Agent, or Firm*—Bret E. Field; Bozicevic, Field & Francis

(57) ABSTRACT

Aqueous mineral compositions and methods for their use are provided. The subject aqueous mineral compositions include a plant nutrient mineral component that is made up of at least one plant nutrient mineral, e.g. calcium, manganese, zinc, iron, and a source of a naturally occurring low molecular weight chelating agent, e.g. a citric acid cycle intermediate or derivative thereof. The subject compositions find use in a variety of different applications, and are particularly suited for use in increasing the mineral content of a plant.

31 Claims, No Drawings

AQUEOUS MINERAL COMPOSITIONS AND METHODS FOR THEIR USE

FIELD OF THE INVENTION

The field of this invention is agriculture, particularly fertilizer compositions used therein.

BACKGROUND OF THE INVENTION

Fertilizers are materials that are used to supply elements needed for plant nutrition. Fertilizer materials may be in the form of solids, semi-solids, slurry suspensions, pure liquids, aqueous solutions and gases. Fertilizing materials may be introduced into a plant's environment in a number of different ways, including through addition to the soil, through application directly to a plant's foliage, and the like. The use of fertilizers is critical to commercial agriculture as fertilizers are essential to correct natural deficiencies and/or replace components in soil. A number of different types of fertilizer compositions have been developed and employed in agriculture. However, there is continued interest in the development of new fertilizer compositions.

One type of element that is present in fertilizer composition is a plant nutrient mineral. Plant nutrient minerals of interest include: calcium, zinc, manganese, iron, etc. When plant nutrient minerals are administered in fertilizer compositions, they face a potential problem of "tie-up" on soil particles and/or plant tissue surfaces, e.g. foliage surfaces. Tie-up can result from electrostatic interactions, formation of insoluble precipitates, etc.

As it is desirable in many instances to employ a mineral containing fertilizer composition, of great interest is the identification of mineral compositions that do not suffer from tie-up. Of particular interest would be compositions which are made up of naturally occurring components.

Relevant Literature

U.S. Patents of interest include: U.S. Pat. Nos. 5,797,976; 5,696,094; 5,582,627; and 5,549,729.

SUMMARY OF THE INVENTION

Aqueous mineral compositions and methods for their use are provided. The subject aqueous mineral compositions include a plant nutrient mineral component that is made up of at least one plant nutrient mineral, e.g. calcium, manganese, zinc, iron, and a source of a naturally occurring low molecular weight chelating agent, e.g. a citric acid cycle intermediate or derivative thereof. The subject compositions find use in a variety of different applications, and are particularly suited for use in increasing the mineral content of a plant.

DESCRIPTION OF THE SPECIFIC EMBODIMENTS

Aqueous mineral compositions and methods for their use are provided. The subject aqueous mineral compositions include a plant nutrient mineral component that is made up of at least one plant nutrient mineral, e.g. calcium, manganese, zinc, iron, and a source of a naturally occurring low molecular weight chelating agent, e.g. a citric acid cycle intermediate or a derivative thereof. The subject compositions find use in a variety of different applications, and are particularly suited for use in increasing the mineral content of a plant. In further describing the subject invention, the compositions will be described first in greater detail followed by a review of representative applications in which the compositions find use.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

Compositions

As summarized above, aqueous mineral compositions are provided by the subject invention, where the aqueous mineral compositions include: (a) a plant nutrient mineral component that is made up of at least one plant nutrient mineral; and (b) a source of at least one naturally occurring chelating agent. Each of these components of the subject aqueous mineral compositions is now described separately in greater detail.

Plant Nutrient Mineral Component

The plant nutrient mineral component is a made up of one or more distinct plant nutrient minerals. Where the plant nutrient mineral component is made up of a plurality of (i.e. 2 or more) different plant nutrient minerals, the number of different minerals in the component typically ranges from about 2 to 15, usually from about 2–10 and more usually from about 2 to 5, wherein in certain embodiments the number of different minerals in the component ranges from about 2 to 4 and more usually from about 2 to 3. In many embodiments where a plurality of plant nutrient minerals make up the plant nutrient mineral component, the number of different plant nutrient minerals in the plant nutrient component is 3. In many other embodiments, the plant nutrient mineral component is made up of a single plant nutrient mineral.

The plant nutrient minerals that may be present in the plant nutrient mineral component are minerals that are beneficial to a plant. In many embodiments, the minerals are minerals that enhance the health of the plant, as measured in terms of growth rate, fruit production, fruit quality, disease resistance, tolerance to environmental stress and in general, the over improvement of the metabolic efficiency of the plant's physiology, and the like. Representative plant nutrient minerals include, but are not limited to: calcium, manganese, iron, zinc, etc. Additional plant nutrient minerals include, but are not limited to: molybdenum, cobalt, boron, copper, silicon, selenium, nickel, aluminum, chromium and the like. Yet additional nutrients of interest in certain embodiments include, but are not limited to: nitrogen, phosphorous, potassium, magnesium, chloride, sodium, sulfur, and the like. In one embodiment, the plant nutrient mineral component is made up solely of calcium. In a second embodiment, the plant nutrient mineral component is made up solely of manganese. In a third embodiment, the plant nutrient mineral component is made up solely of zinc. In a fourth embodiment, the plant nutrient mineral component is made up solely of iron. In a fifth embodiment, the plant nutrient mineral component is made up of a plurality of three different plant nutrient minerals selected from the group consisting of calcium, manganese, zinc and iron, where a preferred component is made up of zinc, manganese and iron.

The plant nutrient mineral component of the subject aqueous mineral compositions makes up a significant percentage of the subject compositions. As such, the plant nutrient mineral component makes up from about 2 to 36, usually from about 3 to 15 and more usually from about 5 to 10% by weight of the subject aqueous mineral compositions. Where the plant nutrient mineral component is made up of a single plant nutrient mineral, e.g. calcium, iron, zinc, manganese, etc., the mineral typically is present in amounts ranging from about 2 to 36, usually from about 3 to 15 and more usually from about 5 to 10% by weight of the aqueous mineral composition. Where the plant nutrient mineral composition is made up of a plurality of different minerals, each distinct mineral is generally present in amount from about 0.5 to 30, usually from about 0.5 to 12 and more usually from about 1 to 10% by weight, where the combined amount of minerals generally ranges from about 2 to 40%, usually from about 4 to 20% and more usually from about 5 to 15% by weight of the aqueous mineral composition.

Source of Naturally Occurring Chelating Agent

As summarized above, the subject aqueous mineral compositions also include a source of at least one naturally occurring chelating agent. By naturally occurring chelating agent is meant that the chelating agent is a chelating agent that occurs in nature, i.e. not an agent that has been first synthesized by human intervention. The naturally occurring chelating agent is generally a low molecular weight chelating agent, where by low molecular weight chelating agent is meant that the molecular weight of the chelating agent does not exceed about 200 daltons. In many embodiments, the molecular weight of the chelating agent is greater than about 100 daltons.

Of particular interest as naturally occurring low molecular weight chelating agents are microbial produced chelating agents, where by "microbial produced" is meant that the chelating agent is produced by a microbe, where the microbe is generally a bacterium or a fungus. In many embodiments, the chelating agents are citric acid cycle intermediates and derivatives thereof. Specific chelating agents of interest include: malic acid, succinic acid, oxalacetic acid, ketoglutaric acid and citric acid and amino acids derived from citric acid cycle intermediates, such as glycine (75.1 daltons), alanine (89.1 daltons), serine (105.1 daltons), valine (117.2 daltons), threonine (119.1 daltons), cysteine (121.2 daltons), leucine (131.2 daltons), isoleucine (131.2 daltons), asparginine (132.1 daltons), glutamine (146.2 daltons), methionine (149.2 daltons), etc.

As mentioned above, the compositions comprise a source of at least one naturally occurring chelating agent. By source is meant that the compositions may include the chelating agents or an entity or component that produces the chelating agents. In many embodiments, the source of chelating agents is a living or viable microbial source of chelating agents. Generally, the microbial source is a bacterial or fungal culture which produces the requisite chelating agents.

Any convenient microbial source may be present in the composition. Representative microbes of interest include: *Bacillus thuringiensis,* strain 201 (active against Coleoptera); *Bacillus Thuringiensis,* strain 202 (active against Lepidoptera) and *Bacillus subtilis,* strain 301 (effective pathogen antagonist). Microbial sources of interest also include, but are not limited to, those listed in Table 1 below.

TABLE 1

Alternative microbial strains used to provide complexing agents, disease and/or insect Suppressiveness:

| | | Suppressive Quality | | |
|---|---|---|---|---|
| Microbial Species | Group | Patho-gens | Arthro-pods | Nematodes |
| *Ampelomyces quisqualis* | Fungus/ Coelomycetes | + | | |
| Arthrobotrys species | Fungus/Fungi Imperfecti | | | + |
| *Ascoryne sarcoides* | Fungus/ Ascomycete | + | | |
| *Bacillus penetrans* | Bacteria/ Bacillaceae | | | + |
| *Bdellovibrio bacteriovorus* | Bacteria/ Spirillaceae | + | | |
| *Beauveria bassiana* | Fungus/Fungi Imperfecti | | + | |
| Candelabrella species | Fungus/Fungi Imperfecti | | | + |
| Catenaria species | Fungus/ Chytridiomycetes | | + | |
| Chaetomium species | Fungus/ Ascomycetes | + | | |
| Cladosporium species | Fungus/Fungi Imperfecti | + | | |
| Coniothyrium species | Fungus/ Coelomycetes | + | | |
| Dactylella species | Fungus/Fungi Imperfecti | | | + |
| Erwinia species | Bacteria/ Enterobacteriaceae | + | | |
| Fusarium species | Fungus/Fungi Imperfecti | + | | |
| Genicularia species | Fungus/Fungi Imperfecti | | | + |
| Gliocladium species | Fungus/Fungi Imperfecti | + | | |
| Hansfordia species | Fungus/Fungi Imperfecti | + | | |
| *Laetisaria arvalis* | Fungus/ Basidiomycete | + | | |
| *Leucopaxillus cerealis* | Fungus/ Basidiomycete | + | | |
| *Myrothecium verrucaria* | Fungus/ Coelomycete | + | | |
| *Nematophthora gynophila* | Fungus/ Oomycete | | | + |
| Penicillium species | Fungus/Fungi Imperfecti | + | | + |
| *Peniophora gigantean* | Fungus/ Basidiomycete | + | | |
| Phialoophora species | Fungus/Fungi Imperfecti | + | | |
| *Pisolithus tinctorius* | Fungus/ Basidiomycete | + | | |
| *Pythium oligandrum* | Fungus/ Oomycete | + | | |
| *Scytalidium uredinicola* | Fungus/Fungi Imperfecti | + | | |
| Sporidesmium sp. | Fungus/Fungi Imperfecti | + | | |
| Streptomyces species | Actinomyce/ Actinomycetales | + | | |
| Trichoderma species | Fungus/Fungi Imperfecti | + | | + |
| *Trichothecium roseum* | Fungus/Fungi Imperfecti | + | | |
| *Tuberculina maxima* | Fungus/ Coelomycete | + | | |
| Verticillium species | Fungus/Fungi Imperfecti | + | | + |

The composition may include a single type of microbe or a plurality of different types of microbes, where then composition includes a plurality of different types of microbes, the number of different types of microbes in the composition generally ranges from about 1 to 30, usually from about 1 to 15 and more usually from about 2 to 5. Of particular interest are microbes that exhibit disease and/or pest suppressing activity. Representative microbes that exhibit disease suppressing activity and/or pest suppressing activity include, but are not limited to, certain of those listed above, and the like.

The amount of microbes present in the aqueous mineral composition is sufficient provide the requisite concentration of chelating agents. Generally, the amount of microbes ranges from about 1,000 to 100 billion, usually from about 1000 to 10 billion and more usually from about 1,000 to 1 billion cfu/ml.

Water

As the subject compositions are aqueous compositions, they further include a substantial amount of water. The amount of water present in the composition may vary. Generally, the compositions include at least about 5%, usually at least about 20% and more usually at least about 30% water, where the amount of water present in the composition may be as high as 80% or higher, but generally does not exceed about 70% and usually does not exceed about 40%.

Additional Components

The subject compositions may include one or more additional components that impart one or more desired characteristics to the composition, e.g. enhanced microbe environment, suppression of fermentation activity, etc. One optional component of interest is one or more carbohydrates, e.g. simple sugars, where carbohydrates can buffer the microbes from detrimental components in the mixture. Fermentation suppression agents of interest include pH reducing agents, e.g. organic acids, and/or preservatives, e.g. potassium sorbate, propionic acid, acetic acid, etc.

Composition Preparation

The aqueous mineral compositions are prepared by combining sources of the minerals, the source of at least one chelating agent and water, as well as any other additional components, under conditions sufficient to produce an aqueous mineral composition. In many embodiments, dry sources of the mineral(s) are combined with an aqueous culture of microbes (where the microbes are the source of the naturally occurring chelating agents) where these two components are combined in amounts sufficient to yield the desired aqueous mineral composition.

The various components used to produce the subject compositions may be obtained from any convenient source and/or produced using conventional protocols known to those of skill in the art. For example, the microbial culture employed in many embodiments of the subject invention may be prepared using conventional culture techniques. The water that is used to produce the subject compositions may be tap water obtained from any convenient water source, e.g. a municipal water district, where the water may be purified or otherwise treated, e.g. to remove certain undesirable agents that may be initially present therein. The various minerals may be obtained from any convenient source, e.g. commercial vendors. A representative protocol for preparing the subject compositions is provided in the Experimental Section, infra.

Utility

The subject aqueous mineral compositions find use in a variety of applications. For example, the subject aqueous mineral compositions find use in enhancing the mineral content of a plant, i.e. the level of one or more minerals in the plant. The mineral level that is increased in the subject methods is the level of the mineral that is present in the composition employed in the subject methods. For example, if the mineral in the aqueous mineral composition is calcium, the level of calcium in the plant will be increased. The amount of increase accomplished by the subject methods is significant, where the magnitude of the increase is at least about 5%, usually at least about 20% and more usually at least about 75%, as compared to a control. Increasing the mineral content of a plant via the subject methods may be performed to achieve a variety of outcomes, including increasing plant health, increasing plant growth rate, increasing fruit size, enhancing fruit quality, etc.

The subject compositions also find use in pest control. Where the subject compositions are used in pest control, the compositions are used to at least reduce the undesirable activity of one or more pests with respect to a plant, where this reduction in undesirable activity may be accomplished via a number of different mechanisms, e.g. through death of the pest, through modification of the pest such that it produces reduced amount of toxic agents, etc. Pests that may be controlled with the subject compositions include: Lepidopterous pests, such as Peach Twig Borer, Oriental Fruit Moth, Codling Moth, Omnivorous Leafroller, Orange Tortrix, Green Fruitworm, Fruit Tree Leaf Roller, Cankerworm, Cutworm, Navel Orangeworm, Grapeleaf Skeletonizer, Grape Leaffolder, Armyworms, Saltmarsh Caterpillar, Sphinx Moths, Indian Meal Moth, Raisin Moth, American Plum Borer, Prune Limb Borer, Clear-Winged Moths (Sesiidae), Carpenter Moth, and the like; Coleopterous Pests, such as Grape Bud Beetle, Flea Beetle, Branch and Twig Borer, Japanese Beetle, Rose Beetle, Wireworms or Click Beetles (Elateridae), Hoplia Beetle, Western Grape Rootworm, Little Bear Beetle, Darkling Ground Beetle, Dried Fruit Beetle, Sawtoothed Grain Beetle, Southern Pine Beetle (Buprestidae), Longhorn Beetles (Cerambycidae), and the like, etc.

The subject compositions also find use in disease control. By disease control is meant that the subject compositions may be used to at least reduce the magnitude of a symptom of a plant disease, e.g. rot. Diseases that may be controlled using the subject compositions include: Fungal Diseases, such as Brown Rot, White Mould, Peicillum Rot, Scab, Anthracnose, Hull Rot, Eutypa Deadarm, Phomopsis, Powdery Mildew, Downey Mildew, Nectria Canker, Certocystis Canker, Cytospora Canker, Branch Wilt, Grey Mould, Shothole, Bread Mould, Alternaria Blight, Late Blight, Early Blight, Sooty Mould, Aerial Phytophthora, Fusarium Canker, and the like; Bacterial Diseases, such as Bacterial Canker, Walnut Blight, Fireblight, Angular Leaf Spot, Bacterial Leaf Spot, Bacterial Galls, and the like; etc.

In practicing the subject methods, the aqueous mineral composition is applied to at least one of: the plant, a portion thereof and soil associated therewith. As such, the composition is, in many embodiments, employed to foliage of the plant, e.g. either the entire part of the plant which is above the soil level or a portion thereof, e.g. fruit, leaves, etc. In other embodiments, the composition is applied to soil associated with the plant, i.e. soil proximal to the plant in which the plant is growing, i.e. soil that is contacted by the roots of the plant or from which the plant's roots ultimately obtain nutrients and/or water.

A variety of different application protocols may be employed to apply the aqueous mineral composition. In certain embodiments, the aqueous composition is contacted with the soil. By contact is meant that the composition is introduced into the soil. As such, contact can include spraying so that the composition soaks into the soil, injecting the composition into the soil, flooding the soil with the composition, and the like. In yet other embodiments, the composition is contacted with at least a portion of the foliage of the plant. By contact in this context is meant that the aqueous composition is placed on the surface of the foliage of the plant(s) to be treated, where the term "foliage" is used broadly to encompass not only the leaves of the plant, but every other part of the plant that is not underground, i.e. below the soil surface, such that the term "foliage" includes leaves, stems, flowers, fruit, etc. Contact may be by any convenient method, including spraying, applying etc.

Depending on the particular protocol being performed and the desired outcome, as well as the nature of the composition, the environmental conditions and any other factors, the composition may be applied more than once over a given period of time. As such, the composition may be applied daily, weekly, every two weeks, monthly etc.

In many embodiments of the subject invention, the aqueous mineral compositions described above are applied or delivered in combination with an aqueous delivery vehicle. The aqueous delivery vehicle may be pure water, e.g. tap water, or an aqueous compositions that includes a carbohydrate source and other components. Of interest in many embodiments as aqueous delivery vehicles are those aqueous compositions described in copending application Ser. Nos. 09/149,930 and 09/222,459; the disclosures of which are herein incorporated by reference. When delivered in combination of with an aqueous delivery vehicle, the ratio of the mineral composition to vehicle typically ranges from about 1 to 40, usually from about 1 to 20 and more usually from about 1 to 10.

The rate at which the subject compositions are applied to the plants may vary depending on the particular nature of the composition and the method by which it is applied, so long as a sufficient amount of the composition is applied to obtain the desired enhancement in mineral content of the plant. In many embodiments, the compositions are applied at a rate of between about 0.5 pint and 20 pts, usually from about 1 to 16 pts and more usually from about 1 to 8 pts/acre.

The following examples are offered by way of illustration and not by way of limitation.

EXPERIMENTAL

Methodology

| Materials Component | Composition | Vendors |
|---|---|---|
| Amino Acid Mixture | (see Appendix A, infra) | California Spray Dry Co<br>4221 E. Mariposa Rd<br>Stockton, CA 95205-0035 |
| Molasses | Sucrose - 15–26%<br>Reducing Sugars - 50–65%<br>Total Sugars - 74–79%<br>Sugars as Invert - 75–80%<br>Soluble Non Sugars - 6–9%<br>Sulphated Ash - 2–3%<br>Degrees Brix - 80–86 deg<br>pH - 5–6<br>Dry Matter - 80–85% | PM Ag Products<br>2115 W. Washington St<br>Stockton, CA 95203 |
| Ca Ligno-sulfonate | Reducing Sugars - 16%<br>Solids - 56–60%<br>Total Sulfur - 6%<br>Calcium - 4%<br>Sodium - 0.1%<br>Lignosulfonate - 58%<br>pH - 3–4.5 | Borregaard Lignotech<br>721 Route 202/206<br>Bridgewater NJ 08807<br>Westway Trading Corp<br>2130 Washington St<br>Stockton, CA 95203 |
| Yeast Extract | Thiamine (B-1) - 0.2–2.0%<br>Riboflavin (B-2) - 0.2–2.0%<br>Niacin - 0.2–2.0%<br>Vitamin B-6 - 0.2–2.0%<br>Folic Acid - .001–0.5%<br>Vitamin B-12 - 0.2–2.0%<br>Pantothenic Acid - 0.2–2.0%<br>Biotin - .001–0.5% | California Spray Dry Co.<br>4221 E. Mariposa Rd<br>Stockton, CA 95205-0035<br><br>Spectrum Chem Mfg Corp<br>14422 S. San Pedro St<br>Gardena, CA 90248-9985 |

1. Culturing of select microbial strains

| Material | Rate/1,000 Gallons | Comments |
|---|---|---|
| Cane Molasses | 50 gal | Materials are brought into solution then |
| *Amino Acid Mixture | 400 lbs | sterilized before inoculating with bacterial strains. |
| Yeast Extract | 125 lbs | |
| Calcium Lignosulfonate | 15 gal | |

2. Starter cultures are grown in nutrient broth (DIFCO@ 10 g/L) supplemented with 1% w/w yeast extract at 28 deg C. for 48 hours on a shaker.

a) *Bacillus thuringiensis* strain 201 (Active against Coleoptera)

b) *Bacillus thuringiensis* strain 202 (Active against Lepidoptera)

c) *Bacillus subtilis* strain 301 (Effective pathogen antagonist)

3. Commercial fermentation vats are all equipped with sterile systems of aeration, line cleaning with ozonation, etc. The commercial cultures are allowed to cultivate for 120 hours for complete formation of organic acids and populations (>10 billion cfu/ml).

4. Mineral mixes are made according to standard protocol except that the water fraction is replaced with the homogeneous blended liquid bacterial culture (i.e. 1 part *B. thuringiensis* 201, 1 part *B. thuringiensis* 202, 1 part *B. subtilis* 301).

5. Production of soluble calcium for foliar and soil use (Trade Name: Integrity™ Calcium)

| Compound | Per 1,000 Gallons Total Mix | % Ca | % N | % Cl | % Ac |
|---|---|---|---|---|---|
| Ca(NO3)2-4H2O | 3,177 lbs | 6.4% | 4.2% | — | — |
| Ca Acetate | 788 lbs | 2.0% | — | — | 6.0% |
| Ca(Cl)2-2H2O | 388 lbs | 0.9% | — | 1.8% | — |

-continued

| Compound | Per 1,000 Gallons Total Mix | % Ca | % N | % Cl | % Ac |
|---|---|---|---|---|---|
| Ca Gluconate-H2O | 200 lbs | 0.2% | — | — | — |
| Bacterial Culture | ~900 gal | 0.2% | 0.5% | — | — |
| Totals | | 9.7% | 4.7% | 1.8% | 6.0% |

Note:
The spore-forming species are resilient to this formulation. However, if sensitive species are used, a simple sugar or sugar alcohol (e.g. fructose, glucose or mannitol) is added to provide a buffer on toxicity. To quiet the opportunity for metabolizing of this carbohydrate, preservatives such as propionic acid (@ ~0.5%–1.5%) are used.

Directions on Mixing Integrity Calcium:

1) Warm bacterial culture to ~37 deg C. Start with 600 gallons.
2) Under constant agitation gradually add calcium gluconate and bring into solution.
3) Follow with calcium acetate.
4) Add more warmed bacterial culture as necessary and add calcium nitrate.
5) Follow last with calcium chloride.
6) Thoroughly solubilize all minerals then pass through an 100-mesh bag filter to remove extraneous debris.
7) Store in clean polyethylene tank and containerize as needed.

6. Production of soluble zinc for foliar and soil use (Integrity™ Zinc)

| Element | % Needed | Source | % In Source | Per 1,000 Gal Amount Needed |
|---|---|---|---|---|
| Zinc | 9.0% | ZnSO4-H2O | 35.5% | 2,790 lbs |
| Solvent | 91.0% | Bacterial Culture | — | ~850 gal |
| Total | 9.0%Zn | | | |

Directions on Mixing Integrity Zinc:

1) Fill tank with about 750 gallons of bacterial culture and begin agitation.
2) Gradually add Zn while agitating and bring into complete solution.
3) Bring up final volume to 1,000 gallons.
4) Remove any particulates through bag filtration.
5) Store in a cone-bottom tank to allow any further particulate settling. Do this for no less than 48 hours.
6) Decant the pure solution into respective containers.

7) Production of soluble manganese for foliar and soil use (Integrity™ Manganese)

| Element | % Needed | Source | % In Source | Per 1,000 Gal Amount Needed |
|---|---|---|---|---|
| Manganese | 7.0% | MnSO4 | 31.0% | 2,440 lbs |
| Solvent | 93.0% | Bacterial Culture | — | ~865 gal |
| Total | 7.0%Mn | | | |

Directions on Mixing Integrity Manganese:

1) Fill tank with about 750 gallons of bacterial culture warmed to ~37 deg C. and begin agitation
2) Gradually add Mn while agitating and bring into complete solution.
3) Bring up final volume to 1,000 gallons.
4) Remove any particulates by pumping through a bag filtration set at 100-mesh.
5) Store in a cone-bottom tank and allow further settling of particulates. Do this for no less than 48 hours.
6) Decant the pure solution into respective containers.

8. Production of soluble iron for foliar and soil applications (Integrity™ Iron):

| Element | % Needed | Source | % In Source | Per 1,000 Gal Amount Needed |
|---|---|---|---|---|
| Iron | 5.0% | FeSO4-720 | 30.0% | 875 lbs |
| Solvent | 95.0% | Bacterial Culture | — | ~900 gal |
| Total | 5.0%Fe | | | |

Directions on Mixing Integrity Iron:

1) Fill the mixing tank with about 750 gallons of bacterial culture warmed to ~37 deg C. and begin agitation.
2) Gradually add Fe while agitating and bring into complete solution.
3) Bring up final volume to 1,000 gallons.
4) Remove particulates through bag filtration set at 100-mesh.
5) Store in a cone-bottom tank to allow any further settling of particulates. Do this for a minimum period of 48 hours.
6) Decant the pure solution into respective containers.

9. Production of a 4% Zn-2%Mn-2% Fe mixture for foliar and soil applications (Z-422)™

| Element | % Needed | Source | % In Source | Per 1,000 Gal Amount Needed |
|---|---|---|---|---|
| Zn | 4.0% | Integrity Zn | 9% Zn | 445 gal |
| Mn | 1.0% | Integrity Mn | 7% Mn | 155 gal |
| Fe | 2.0% | Integrity Fe | 5% Fe | 400 gal |
| Mn | 1.0% | MnSO4 | 31.0% | 355 lbs |
| Totals -> 4% Zn, 2% Mn, 2% Fe | | | | |

Directions for Mixing Z-422:

1) Add 445 gallons of Integrity Zn to a mixing tank and begin agitation.
2) Gradually blend in 155 gallons of Integrity Mn.
3) Follow with 400 gallons of Integrity Fe.
4) While agitating gradually add 355 lbs of manganese sulfate and dissolve completely.
5) Filter through a bag filter set at 100-mesh to remove debris and particulates.
6) Store in a cone-bottom tank to allow any further settling of particulates. Do this for no less than 48 hours.
7) Decant the pure solution into respective containers.

10. Greenhouse and Field Tests with Integrity Calcium

Apples:

A. Being a truer indication over leaves, fruit flesh levels of Ca were examines
B. Apple fruit (var: Fuji) were 1$^{st}$ examined on June 14
C. Fruit was washed with 1% dishwater detergent and rinsed with distilled water D. Fruit was sprayed every week for 5 successive sprays. Rates used were equivalent to 3 qts/100 gallons spray
E. Final sampling occurred on July 15

| | Replications | | | | |
|---|---|---|---|---|---|
| Treatment | 1 | 2 | 3 | 4 | Mean |
| Beginning Status | 0.04% | 0.03% | 0.03% | 0.03% | 0.03% a |
| Untreated CK | 0.05% | 0.04% | 0.04% | 0.04% | 0.04% a |
| Integrity Ca (5x) | 0.09% | 0.11% | 0.10% | 0.12% | 0.11% b * |

Peaches:
A. As with apples, fruit levels of Ca were examined
B. Peach fruit were 1st examined on June 6 (var: Carson)
C. Fruit was washed with 1% dishwater detergent and rinsed with distilled water
D. Fruit was sprayed every 10 days for 3 successive sprays. Rates used were equivalent to 3 qts/100 gallons spray
E. Fruit flesh Ca levels were examined on July 10

| | Replications | | | | |
|---|---|---|---|---|---|
| Treatment | 1 | 2 | 3 | 4 | Mean |
| Beginning Status | 0.07% | 0.07% | 0.08% | 0.08% | 0.08% a |
| Untreated CK | 0.08% | 0.09% | 0.09% | 0.09% | 0.09% a |
| Integrity Ca (3x) | 0.22% | 0.21% | 0.20% | 0.22% | 0.21% b * |

* = Statistically different at less than the 5% level of significance

Grapevines:
A. Sampling began on May 1 to establish a baseline Ca level

| | Replications | | | | |
|---|---|---|---|---|---|
| Treatment | 1 | 2 | 3 | 4 | Mean |
| Beginning Status | 0.85% | 0.90% | 0.80% | 0.85% | 0.85% a |
| Untreated CK | 0.90% | 0.95% | 1.05% | 1.10% | 1.00% a |
| Integrity Ca (3x) | 2.25% | 2.05% | 2.00% | 2.10% | 2.10% b * |

* = Significantly different at less than the 5% level of significance

11. Greenhouse Tests with Z-422

Tomatoes (Foliar Study)

A. Sampling was initiated on July 1 to establish a baseline for Zn, Mn & Fe

B. Leaves were taken from 2nd and 3rd nodes (var: Rutgers)

C. Leaves were gently washed in 1% dishwater detergent and rinsed in distilled water D. Sprays were applied on July 2 and continued 3× at 7 day intervals through July 23. Rates used were equivalent to 1 qt/100 gallons spray E. Final sampling occurred on July 27 and washed as outlined above

| | Leaf Zn, Mn & Fe Levels | | | | | | | | | | | | | | |
|---|---|---|---|---|---|---|---|---|---|---|---|---|---|---|---|
| | 1 | | | 2 | | | 3 | | | 4 | | | Mean | | |
| Treatment | Zn | Mn | Fe | Zn | Mn | Fe | Zn | Mn | Fe | Zn | Mn | Fe | Zn | Mn | Fe |
| Beginning | 18 | 65 | 66 | 17 | 50 | 71 | 21 | 67 | 71 | 20 | 59 | 64 | 19 | 60 | 68 |
| Control | 20 | 66 | 70 | 19 | 55 | 78 | 25 | 70 | 70 | 19 | 57 | 64 | 21 | 62 | 71 |
| *Z-422 | 59 | 120 | 135 | 62 | 118 | 140 | 68 | 138 | 148 | 61 | 128 | 155 | 63 | 126 | 145 |

*= All levels of Zn, Mn & Fe were significantly increased at statistical tests below the 5% level of significance B. Leaves were pulled from the 4th and 5th nodes (var: Chardonnay)

C. Leaves were washed in 1% dishwater detergent and rinsed with distilled water

D. Spraying began on May 2 and continued 3× at 7 day intervals through May 23. Rates used were equivalent to 3 qt/100 gallons spray E. Final sampling occurred on May 27 and washed as outlined in 'C'

Tomatoes (Soil Study)
A. Plants were grown in sterilized loam for 65 days
B. The treated control and Z422 plants were irrigated with ½ strength Hoagland's Complete Nutrient Solution. The complete control was irrigated with tap water only
C. Treatment plants were supplemented with 2 irrigations of Z-422 equivalent to 2 qts/ac. Irrigations were spaced 2 weeks apart
D. At the end of 65 days leaves from the 2nd and 3rd nodes were examined for Zn, Mn and Fe levels

| | Leaf Zn, Mn & Fe Levels | | | | | | | | | | | | | | |
|---|---|---|---|---|---|---|---|---|---|---|---|---|---|---|---|
| | 1 | | | 2 | | | 3 | | | 4 | | | Mean | | |
| Treatment | Zn | Mn | Fe | Zn | Mn | Fe | Zn | Mn | Fe | Zn | Mn | Fe | Zn | Mn | Fe |
| Comp CK | 12 | 36 | 45 | 14 | 38 | 40 | 15 | 28 | 42 | 11 | 30 | 38 | 13 | 33 | 41 a |
| *Treat CK | 21 | 45 | 55 | 22 | 42 | 56 | 23 | 47 | 57 | 26 | 49 | 54 | 23 | 46 | 56 b |
| **Z-422 | 55 | 84 | 120 | 58 | 85 | 115 | 60 | 83 | 124 | 58 | 89 | 130 | 58 | 85 | 122 c |

*= ½ Strength Hoagland's Complete Nutrient Solution Control significantly higher than the Complete Ck @ the 5% level of statistical significance

**= Z-422 Treatment significantly higher than all Controls @ <5% level of statistical significance 12. Greenhouse Tests for Efficacy of Integrity Calcium Against Arthropod Pests:

A. Heat inactivated corn seed was spray coated with Integrity Calcium. The rate used was approximately 6 oz/100 lbs corn seed B. Wireworms were collected from an heavily infested field and 20 various stage instar larvae placed in a plastic box chamber C. Four of the boxes received no treatment (Complete Control)

D. Four of the boxes received 40 kernels of untreated corn (Treated Control)

E. Four of the boxes received 40 kernels of treated corn (Integrity Ca)

F. Boxes were maintained on the table top at ~28 deg C. for 7 days

G. At the end of the incubation period, mortality was examined

| | Number of Viable Larvae: | | | | |
|---|---|---|---|---|---|
| | Replications | | | | |
| Treatment | 1 | 2 | 3 | 4 | Mean |
| Comp CK | 20 | 20 | 20 | 19 | 20 a |
| Treat CK | 19 | 20 | 18 | 20 | 19 a |
| Integrity Ca | 0 | 2 | 1 | 3 | 2 b * |

* = Significant control of wireworms at <5% level of statistical significance

13. Effects of Z-422 on Control of Lepidopterous Pests:

A. Navel Orangeworm (Amyelois transitella) larvae were cultured on bean-alfalfa agar B. When larvae had reached the 3rd instar testing was initiated C. Four groups of 10 larvae received no treatment to the agar (Complete CK)

D. Four groups of 10 larvae received a 4%Zn-2%Mn-2%Fe mist atop the agar using a concentration equivalent to 1 qt/100 gallons spray. The mist was allowed to evaporate before larvae were placed atop the agar (Treated CK)

E. Four groups of 10 larvae received Z-422 mist atop the agar in the same manner as for D. The mist was allowed to evaporate before larvae were placed atop the agar (Z-422)

F. Larvae were incubated in the dark at 28 deg C. for 10 days before examination of mortality

| | Numbers of Viable Larvae: | | | | |
|---|---|---|---|---|---|
| | Replications | | | | |
| Treatment | 1 | 2 | 3 | 4 | Mean |
| Comp CK | 10 | 10 | 9 | 10 | 10 a |
| Treat CK | 10 | 10 | 10 | 9 | 10 a |
| Z-422 | 0 | 0 | 0 | 0 | 0 b * |

* = Control highly significant at <5% level of statistical significance

14. Efficacy of Integrity Calcium Against Disease:

A. Orange fruit were lightly squeezed to impart physical injury

B. Four sets of 10 fruit were left untreated (Complete CK)

C. Four sets of 10 fruit were dipped in a calcium chelate solution equivalent to 3 gallons/100 gallons water and allowed to drip dry before placing in individual boxes (Treated CK)

D. Four sets of 10 fruit were dipped in Integrity Ca at a rate equivalent to 3 gallons/100 gallons water and the carbon-based foliar (Green Thumb) from my previous patent (Foliar Fertilizer and Method for Using the Same) at the rate of 2 gallons/100 gallons, then allowed to drip dry before placing in individual boxes (Integrity Ca)

E. The boxes of oranges were closed and held at 25 deg C. for 30 days

F. At the end of 45 days the fruit were evaluated for rot

Rotten Fruit Following 30 days Incubation

| | Replications | | | | |
|---|---|---|---|---|---|
| Treatment | 1 | 2 | 3 | 4 | Mean |
| Comp CK | 10 | 10 | 8 | 9 | 9 a |
| Treat CK | 8 | 8 | 7 | 9 | 8 a |
| Integrity Ca | 0 | 0 | 0 | 1 | 0 b * |

* = Highly significant control of Penicillium Rot at <5% level of statistical significance It is evident from the above results and discussion that improved mineral compositions that find use in a variety of agricultural applications are provided. The compositions are relatively simple and easy to produce. Despite their simplicity, the compositions can provide for significant improvement in terms of plant health, pest control, disease control and the like. In addition, the compositions are made of natural products that do not pose a health risk to humans or livestock. As such, the subject compositions are a significant advance in the art.

All publications and patent applications mentioned in this specification are herein incorporated by reference to the same extent as if each individual publication or patent application was specifically and individually indicated to be incorporated by reference.

The invention now being fully described, it will be apparent to one of skill in the art that many changes and modifications can be made thereto without departing from the spirit and scope of the appended claims.

What is claimed is:

1. An aqueous mineral composition comprising:

a plant nutrient mineral component in an amount ranging from about 3 to 15%, wherein said plant nutrient mineral component consists of one or more plant nutrient minerals; and a viable microbial source of at least one naturally occurring chelating agent.

2. The composition according to claim 1, wherein said plant nutrient mineral are selected from the group consisting of calcium, manganese, zinc and iron.

3. The composition according to claim 1, wherein said at least one naturally occurring chelating agent has a molecular weight that does not exceed about 200 daltons.

4. The composition according to claim 3, wherein said chelating agent is a citric acid cycle intermediate or derivative thereof.

5. An aqueous mineral composition comprising:

a plant nutrient mineral component in an amount ranging from about 4 to 12%, wherein said plant nutrient mineral component consists of one or more plant nutrient minerals selected from the group consisting of calcium, manganese, zinc and iron; and a viable microbial source of at least one naturally occurring chelating agent, wherein said at least one naturally occurring chelating agent has a molecular weight that does not exceed about 200 daltons.

6. The composition according to claim 5, wherein said plant nutrient mineral component consists of a single plant mineral.

7. The composition according to claim 5, wherein said plant nutrient mineral component consists of a plurality of plant minerals.

8. The composition according to claim 5, wherein said microbial source comprises living bacteria or fungi.

9. The composition according to claim 5, wherein said naturally occurring chelating agent is a citric acid cycle intermediate or derivative thereof.

10. The composition according to claim 9, wherein said citric acid cycle intermediate or derivative thereof is selected from the group consisting of: malic acid, succinic acid, oxalacetic acid, ketoglutaric acid, citric acid, glycine, alanine, valine, leucine, isoleucine, serine, threonine, asparagine, glutamine, cysteine and methionine.

11. An aqueous mineral composition comprising:

a plant nutrient mineral component in an amount ranging from about 5 to 10%, wherein said plant nutrient mineral component consists of one or more plant nutrient minerals selected from the group consisting of calcium, manganese, zinc and iron; and a viable microbial source of at least one naturally occurring chelating agent that is a citric acid cycle intermediate or derivative thereof, wherein said at least one naturally occurring chelating agent has a molecular weight that does not exceed about 200 daltons.

12. The composition according to claim 11, wherein said plant mineral component consists of a single plant mineral.

13. The composition according to claim 12, wherein said single plant mineral is calcium.

14. The composition according to claim 12, wherein said single plant mineral is zinc.

15. The composition according to claim 12, wherein said single plant mineral is manganese.

16. The composition according to claim 12, wherein said single plant mineral is iron.

17. The composition according to claim 11, wherein said plant mineral component consists of a plurality of plant minerals.

18. The composition according to claim 17, wherein said plurality of plant minerals are zinc, manganese and iron.

19. The composition according to claim 11, wherein said microbial source comprises living bacteria or fungi.

20. The composition according to claim 11, wherein said citric acid cycle intermediate is selected from the group consisting of: malic acid, succinic acid, oxalacetic acid, ketoglutaric acid, citric acid malic acid, succinic acid, oxalacetic acid, ketoglutaric acid and citric acid glycine, alanine, valine, leucine, isoleucine, serine, threonine, asparagine, glutamine, cysteine and methionine.

21. A method of increasing the nutrient mineral content of a plant, said method comprising:

applying an aqueous mineral composition according to claim 1 in combination with an aqueous delivery vehicle to said plant or soil associated with said plant.

22. The method according to claim 21, wherein the ratio of said aqueous mineral composition to said aqueous delivery vehicle in said applying step ranges from about 1 to 40.

23. The method according to claim 21, wherein said aqueous delivery vehicle is water.

24. The method according to claim 21, wherein said nutrient mineral is selected from the group consisting of: calcium, manganese, zinc and iron.

25. The method according to claim 21, wherein said applying comprises spraying foliage of said plant.

26. In a method of applying a nutrient mineral to a plant or soil associated therewith, the improvement comprising:

employing an aqueous mineral composition according to claim 1.

27. An aqueous mineral composition comprising:

a plant nutrient mineral component, wherein said plant nutrient mineral component consists of one or more plant nutrient minerals; and a viable microbial source of at least one naturally occurring chelating agent.

28. The composition according to claim 27, wherein said plant nutrient minerals are selected from the group consisting of calcium, manganese, zinc and iron.

29. The composition according to claim 27, wherein said at least one naturally occurring chelating agent has a molecular weight that does not exceed about 200 daltons.

30. The composition according to claim 29, wherein said chelating agent is a citric acid cycle intermediate or derivative thereof.

31. The composition according to claim 27, wherein said plant mineral component is present in an amount ranging from about 3 to 15%.

* * * * *